C. W. NICHOLSON.

Improvement in Peanut-Diggers.

No. 131,891. Patented Oct. 1, 1872.

Witnesses.

Inventor:
C. W. Nicholson
By Hice & Ellsworth
His Attys.

UNITED STATES PATENT OFFICE.

CHARLES W. NICHOLSON, OF SOUTHAMPTON COUNTY, VIRGINIA.

IMPROVEMENT IN PEANUT-DIGGERS.

Specification forming part of Letters Patent No. 131,891, dated October 1, 1872.

*To all whom it may concern:*

Be it known that I, CHARLES W. NICHOLSON, of Southampton county, in the State of Virginia, have invented an Improved Machine for Gathering Peanuts; and I declare the following to be a full, clear, and exact description thereof, reference being had to the accompanying drawing, in which—

Figure 1:
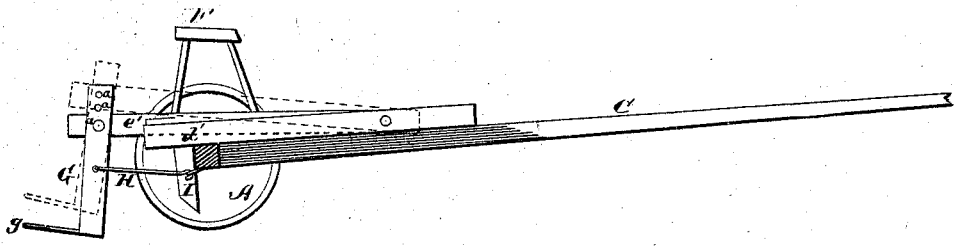
Figure 2:
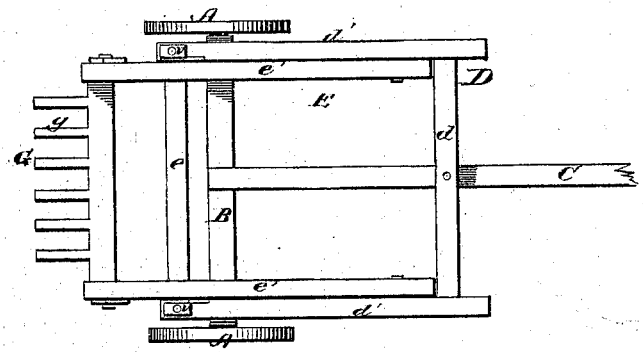
Figure 3:
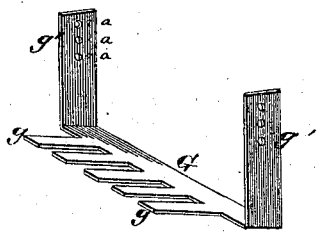

Figure 1 is a longitudinal vertical section; Fig. 2 is a top view; and Fig. 3 is a detached perspective view, showing the cutting-blade or shovel.

Similar letters of reference indicate the same parts.

The object of this invention is to facilitate the harvesting of peanuts; and to this end the invention consists in an improved machine for that purpose, constructed and operating as hereinafter set forth.

In the drawing, A A represent a pair of draft-wheels, B their axle-tree, and C the tongue or draft-pole attached thereto. D is a rectangular frame mounted upon the axle and tongue, said frame consisting of a cross-beam, $d$, supported by the tongue, and two side beams, $d'$ $d'$, extending from the cross-beam slightly to the rear of the axle. E is a supplemental frame, composed of a cross-beam, $e$, and two side beams, $e'$ $e'$, the latter being pivoted to the side beams $d'$ $d'$ just behind the cross-beam $d$, so that the rear end of the supplemental frame is free to swing up and down; and F is the driver's seat, supported upon the frame E, and rising and falling therewith. The frame E can be locked down, if preferred, by means of a couple of buttons, $v$ $v$, or other equivalent device, attached to the rear end of the main frame. Supported by the rear end of the frame E, as shown in Figs. 1, 2, is the instrument G, represented in Fig. 3, said instrument consisting of a flat, nearly horizontal blade or shovel, sharpened to an edge in front, provided with projecting arms or fingers $g$ $g$ in rear, and bent up at each end into a supporting-lug, $g'$, by which it can be adjusted higher or lower upon the frame by means of pins and holes $a$ $a$, so as to run more or less deeply under the surface of the ground. Braces H H, extending from the lower end of the lugs $g'$ to the axle or some part of the frame, give additional strength to the part G, and prevent it from breaking the frame under the heavy strain imposed upon it. Vertical cutters I I, in rear of the axle, extend from the frame E slightly below the level of the blade G, in order to separate the vines and grass in the path of the machine from those alongside of it. These cutters may be made adjustable, like the rear cutter or shovel, by a series of holes and pins, if preferred.

As will be seen, the construction of this machine is exceedingly simple and inexpensive. In fact, the expense is practically limited to the construction of the frames D E and cutters G I I, the other parts—the wheels, axles, and tongue—being of the common form used by all farmers, and therefore always at hand.

Its operation is likewise very simple and easily understood, and is effective and practical. The attendant sitting upon the seat, with his feet resting upon the tongue, presses the shovel into the ground with his whole or any part of his weight, as he may judge best, and is ready to relieve it of the weight at any moment when necessary. If he wishes, he can lock the cutters down when at work by turning the buttons over the frame E, or he can lock them up when not at work by turning the same buttons under said frame.

I am aware of the existence of the patent granted to H. C. Carr for improvements in potato-diggers, dated March 15, 1870, No. 100,854, and make no claim to anything shown therein; but

What I claim as my invention is as follows:

In combination with the fixed frame D mounted upon the wheels, the swinging frame E, pivoted at its forward end to the fixed frame, having the share G $g$ $g'$ and vine-cutters I I attached to its rear end, and supporting, about midway between the pivot and the share, the driver's seat F, so that the weight of the driver upon the seat will operate to hold the share in the ground; all the operative parts being constructed and arranged substantially as and for the purposes specified.

CHARLES WESLEY NICHOLSON.

Witnesses:
W. W. BRIGGS,
L. R. EDWARDS.